(12) United States Patent
Sabban

(10) Patent No.: US 10,742,159 B2
(45) Date of Patent: Aug. 11, 2020

(54) PLATE FOR INSTALLING PHOTOVOLTAIC PANELS

(71) Applicant: SNC YAP, Saint-Ouen (FR)

(72) Inventor: Ylan Gilles Sabban, Saint-Ouen (FR)

(73) Assignee: SNC YAP, Saint-Ouen (FR)

( * ) Notice: Subject to any disclaimer, the term of this patent is extended or adjusted under 35 U.S.C. 154(b) by 0 days.

(21) Appl. No.: 15/262,341

(22) Filed: Sep. 12, 2016

(65) Prior Publication Data

US 2017/0005610 A1    Jan. 5, 2017

Related U.S. Application Data

(63) Continuation of application No. PCT/FR2015/050595, filed on Mar. 10, 2015.

(30) Foreign Application Priority Data

Mar. 10, 2014  (FR) ...................................... 14 51949

(51) Int. Cl.
*H02S 20/23*    (2014.01)
*H02S 20/25*    (2014.01)
*H02S 30/10*    (2014.01)

(52) U.S. Cl.
CPC .............. *H02S 20/23* (2014.12); *H02S 20/25* (2014.12); *H02S 30/10* (2014.12); *Y02B 10/12* (2013.01)

(58) Field of Classification Search
CPC .......... H02S 20/23; H02S 30/10; H02S 20/25; Y02B 10/12
See application file for complete search history.

(56) References Cited

U.S. PATENT DOCUMENTS 309,134 A * 12/1884 Cooper ..................... E04D 1/16
52/536
3,021,927 A * 2/1962 McKee, Jr. ............. E04D 3/365
138/89

(Continued)

FOREIGN PATENT DOCUMENTS

DE    102011104303    12/2012
EP        2541162       1/2013

(Continued)

OTHER PUBLICATIONS

International Search Report for International Application PCT/FR2015/050595, dated Jun. 12, 2015.

*Primary Examiner* — Basil S Katcheves
*Assistant Examiner* — Omar F Hijaz
(74) *Attorney, Agent, or Firm* — Burris Law, PLLC

(57) ABSTRACT

A support plate is provided that is fitted in a photovoltaic panel and allowing said panel to be secured and incorporated onto the roof of a building. The support plate includes a sealed vertical overlapping arrangement, a sealed lateral fitting arrangement, support pads for the plate, and an empty space for cables to pass through and to allow access to framework of the roof. The support plate further includes at least one of guide rails that are arranged in an inverted general V-shape in order to divert the flow of water to lateral sides of the empty space, at least one reinforcement that is interposed between the lateral fitting arrangement and the roof and that is designed to inhibit said fitting arrangement from being crushed, and at least one drilling area and a graduation that is designed to adjust the vertical overlap between two juxtaposed support plates.

17 Claims, 2 Drawing Sheets

(56) References Cited

U.S. PATENT DOCUMENTS

| | | | | |
|---|---|---|---|---|
| 3,775,925 | A * | 12/1973 | Fujita | E04D 1/28 52/534 |
| 4,204,523 | A | 5/1980 | Rothe | |
| 4,406,106 | A * | 9/1983 | Dinges | E04D 3/363 428/63 |
| 5,287,670 | A * | 2/1994 | Funaki | E04D 3/3608 52/478 |
| 6,178,703 | B1 * | 1/2001 | Noone | E04D 1/16 52/100 |
| 6,856,496 | B1 * | 2/2005 | Mucci | H01L 31/048 136/244 |
| 8,713,861 | B2 * | 5/2014 | Desloover | E04D 1/08 126/622 |
| 8,869,471 | B2 * | 10/2014 | Wildes | H01L 31/0422 52/173.3 |
| 2002/0129849 | A1 * | 9/2002 | Heckeroth | E04D 3/40 136/251 |
| 2003/0154680 | A1 * | 8/2003 | Dinwoodie | H02S 20/23 52/519 |
| 2005/0005534 | A1 * | 1/2005 | Nomura | H02S 20/23 52/90.2 |
| 2005/0072092 | A1 * | 4/2005 | Williams | E04D 1/22 52/518 |
| 2008/0302030 | A1 * | 12/2008 | Stancel | H01L 31/02008 52/173.3 |
| 2009/0000222 | A1 * | 1/2009 | Kalkanoglu | E04D 1/20 52/173.3 |
| 2010/0281794 | A1 * | 11/2010 | Saillard | F24J 2/4612 52/173.3 |
| 2011/0162301 | A1 * | 7/2011 | Ueda | H01L 31/05 52/173.3 |
| 2013/0133270 | A1 * | 5/2013 | West | E04B 1/38 52/58 |
| 2014/0224303 | A1 * | 8/2014 | Herwig | H01L 31/0488 136/251 |
| 2015/0089887 | A1 * | 4/2015 | Bellavia | E04D 1/34 52/173.3 |
| 2015/0288327 | A1 * | 10/2015 | Cherukupalli | H02S 30/10 136/251 |

FOREIGN PATENT DOCUMENTS

| | | | |
|---|---|---|---|
| FR | 2977009 A1 * | 12/2012 | E04D 3/32 |
| JP | S626047 | 1/1987 | |
| JP | H10169131 | 6/1998 | |
| JP | 2001107517 | 4/2001 | |
| JP | 2002097754 | 4/2002 | |
| JP | 2003527504 | 9/2003 | |
| RU | 2194827 | 12/2002 | |

* cited by examiner

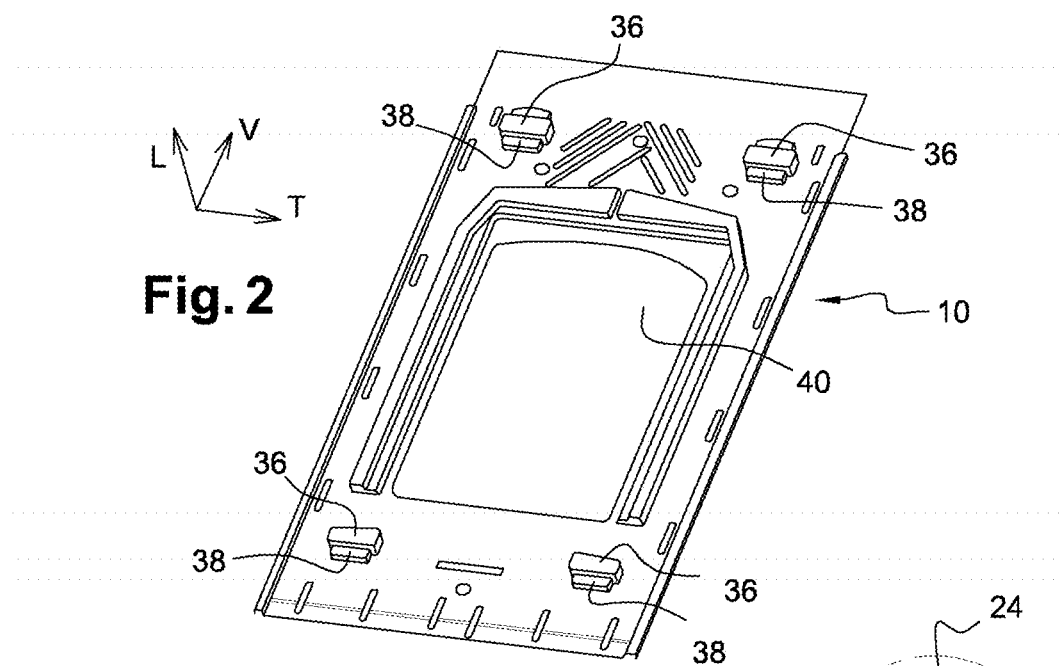
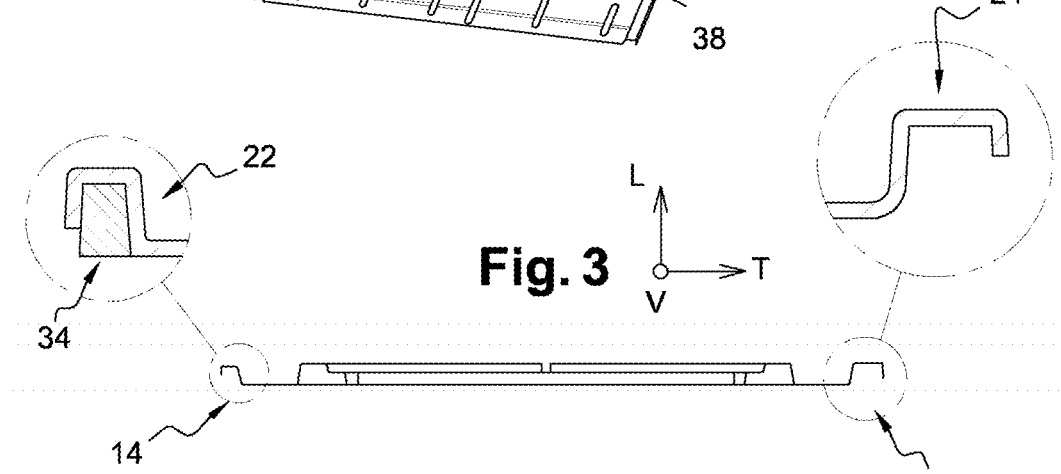
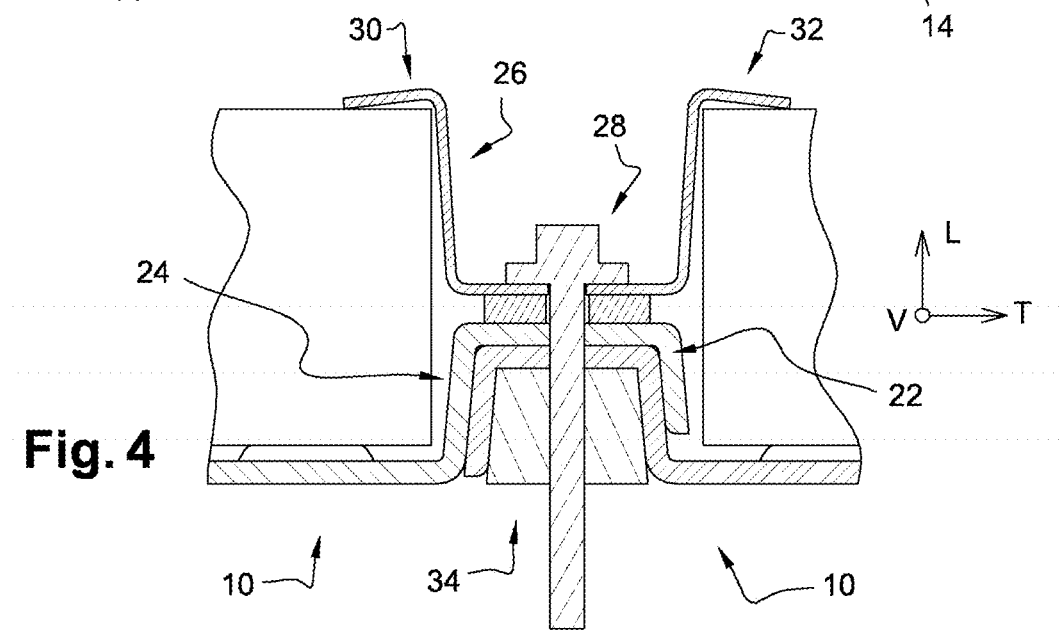

PLATE FOR INSTALLING PHOTOVOLTAIC PANELS

CROSS-REFERENCE TO RELATED APPLICATIONS

This application is a continuation of International Application No. PCT/FR2015/050595, filed on Mar. 10, 2015, which claims the benefit of FR 14/51949 filed on Mar. 10, 2014. The disclosures of the above applications are incorporated herein by reference.

FIELD

The present disclosure concerns a plate for installing photovoltaic panels that allows for a tight, simple, and rapid installation

BACKGROUND

The statements in this section merely provide background information related to the present disclosure and may not constitute prior art.

Installing and fastening photovoltaic panels are traditionally performed using metallic rails systems, which are heavy and require adapted transportation means.

In addition, the traditional systems are often exposed to the risk of water infiltration.

There is known a device for installing photovoltaic panels described and represented in document EP-A-2541162, which includes a thermoformed plate facilitating the installation of the photovoltaic panels.

This support plate is adapted to fit in a photovoltaic panel and enable fastening and integration of this panel on a building roof/roofing. The plate has tight vertical overlapping arrangement, tight lateral fitting arrangement, points for fastening the plate, and an empty space intended for the passage of cables and for access to the framework of the roof.

SUMMARY

The present disclosure relates to a support plate adapted to fit in a photovoltaic panel and enable fastening and integration of this panel on a building roof, comprising:

tight vertical overlapping arrangement,
tight lateral fitting arrangement,
pads for supporting the plate which are raised,
an empty space intended for the passage of cables and for access to the framework of the roof,
and further comprising at least any of the features chosen in the group comprising:
a plurality of guide rails that are arranged upstream of the empty space along the flow direction of the water coming from the ridge of the roof, and which are generally arranged in an inverted V shape so as to divert the flow of the water on the lateral sides of the empty space,
at least one reinforcement which is interposed between the lateral fitting arrangement and the roof and which is designed so as to prevent crushing of said fitting arrangement,
at least one drilling area which is arranged in the vicinity of each support pad and which is raised so as to avoid the penetration of water, and
a graduation that is designed so as to adjust the vertical overlap between two juxtaposed plates.

Each of these different features participates in improving the tightness of the support plate.

In one form, each guide rail forms a bead for diverting the flow of the water on the lateral sides of the empty space.

Besides, the fitting presents a hollow section generally formed in an inverted U shape, and the reinforcement is an affixed part which is arranged in the recess delimited by the fitting.

The reinforcement allows resisting the crushing efforts exerted on the fitting so as to preserve the tightness of the plate.

In addition, the plate comprises a bead disposed so as to avoid the flow of the water coming from the ridge of the roof in the empty space.

A groove is formed in said bead, enabling the passage of cables between the plate and the photovoltaic panel.

According to one form of the present disclosure, each drilling area is raised lesser than the associated support pad so as to enable the arrangement of fastening device.

Besides, the support plate comprises means for lifting and ventilating said photovoltaic panel, and wedges allowing flushing the water coming from the ridge of said roof.

The present disclosure also concerns a set formed by a photovoltaic panel and a plate in accordance with the foregoing fitted in this photovoltaic panel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a perspective view which illustrates the support plate of FIG. 1;

FIG. 3 is a side view which illustrates the tight lateral fitting arrangement of the support plate; and FIG. 4 is a cross-sectional detail view, which illustrates a reinforcement of the lateral fitting arrangement.

Figure 1:
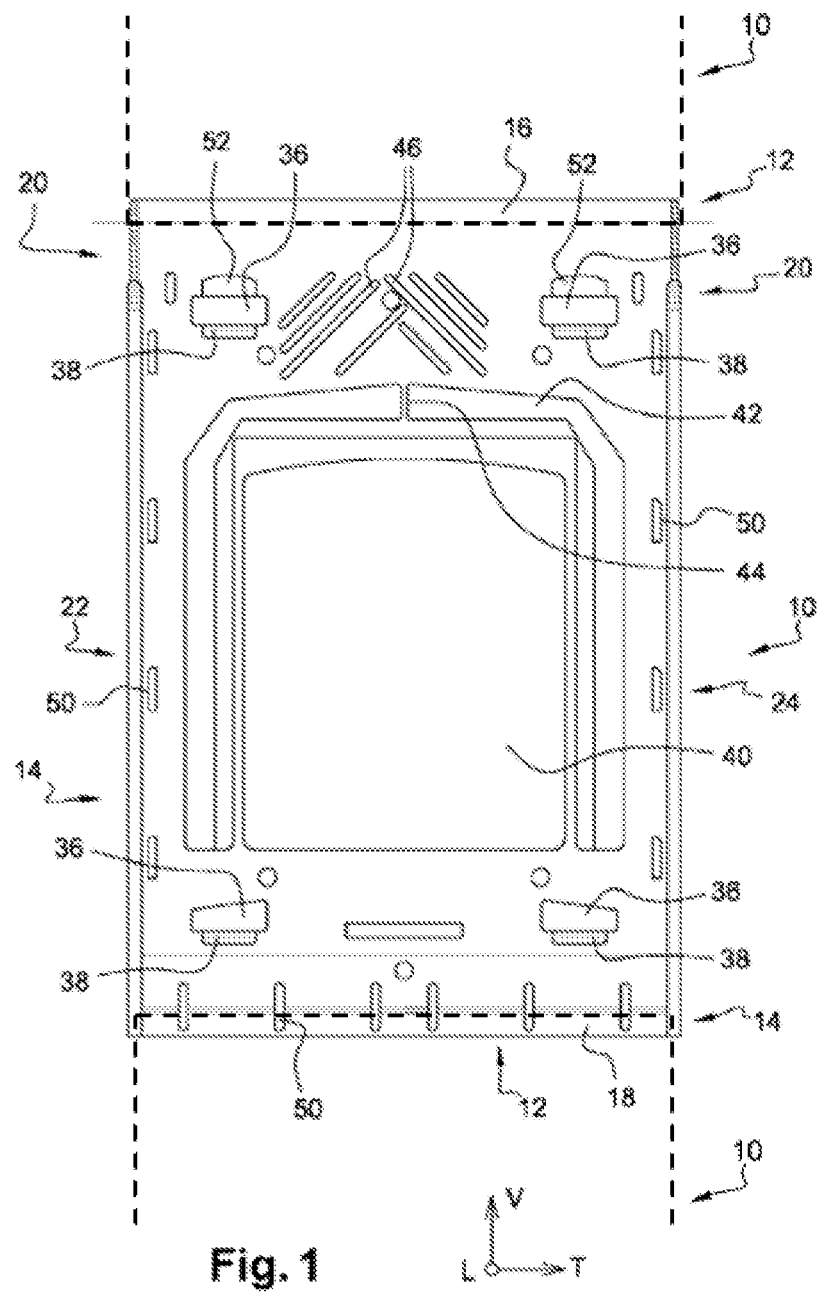
FIG. 1 is a top view which illustrates the support plate according to the present disclosure in the portrait format.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and in the claims, the expressions "upper," "lower" and their derivatives will be used without limitation respectively with reference to the upper portion and lower portion of FIG. 1.

In addition, in order to clarify the description and the claims, the terms longitudinal, vertical and transverse will be adopted without limitation with reference to the trihedron L, V, T indicated in the figures, the vertical axis V herein being considered to be parallel to the slope of the roof, without any reference to the terrestrial gravity.

In all these figures, identical or similar reference numerals represent identical or similar members or sets of members.

It is to be noted that in the present patent application, the terms "upstream" and "downstream" should be understood with reference to the slope of the roof on which the plate is intended to be mounted and to the flow direction of the runoff water.

In FIG. 1, there is represented a support plate 10 adapted to fit in a photovoltaic panel (not represented) and enable fastening and integration of this panel on a building roof.

The plate 10 includes a tight vertical overlapping arrangement 12 and tight lateral fitting arrangement 14.

In one form, the vertical overlapping arrangement 12 are formed by a transverse upper strip 16 and by a transverse lower strip 18 which are adapted to enable overlapping of an upper support plate and of a lower support plate vertically juxtaposed.

According to this configuration, the lower strip 18 of the upper plate 10 covers the upper strip 16 of the lower plate 10 so as to ensure a perfect tightness.

For this purpose, the overlapping arrangement are provided with a graduation 20 which is designed so as to adjust the vertical overlap and the coverage between two juxtaposed plates.

To this end, the graduation represents for example a graduated measuring scale, which is engraved, printed or molded on the upper strip 16 of the support plate 10.

Thus, the graduation 20 allows measuring the overlap of two support plates 10 and providing a low coverage and a good tightness.

In addition, the graduation 20 allows setting the overlap of two juxtaposed support plates 10 based on the dimension of the photovoltaic panel to be installed, so that the support plates can adapt to different formats of photovoltaic panels.

As can be seen in FIG. 3, the lateral fitting arrangement 14 comprise a first profile 22 and a second profile 24, each extending vertically on the sides of the plate 10 and each presenting a hollow section generally formed in an inverted U shape.

The first profile 22 presents a shape adapted to fit in the recess formed by the second profile 24, when two adjacent support plates 10 are juxtaposed transversely, so as to ensure a good tightness between the plates.

According to FIG. 4, a clip 26 is fastened on the profiles 22, 24 by means of a screw 28.

The clip 26 includes a first retaining leg 30 which is adapted to cooperate with a photovoltaic panel carried by a first plate 10, and a second retaining leg 32 which is adapted to cooperate with a photovoltaic panel carried by a second plate 10.

In the case of a pressure exerted on the photovoltaic panels, for example a pressure due to the wind, the panels can transmit a compressive effort with a vertical component on the fitting arrangement 14.

In order to inhibit crushing of the fitting arrangement 14, the support plate 10 is equipped with a reinforcement 34 which is interposed between the lateral fitting arrangement 14 and the roof.

A crushing of the fitting arrangement 14 is to be avoided because it would risk opening a passage for water infiltration, for example by deformation of the hole intended for the passage of the screw 28, or by a rise of the second profile 24.

The reinforcement 34 is an affixed part which is arranged in the recess delimited by the first profile 22 of the fitting arrangement 14 so as to resist crushing of the fitting arrangement 14.

In a non-limiting manner, the reinforcement 34 may also be integrated and formed by the first profile 22, for example during the molding of the first profile 22.

According to another aspect, with reference to FIGS. 1 and 2, the support plate 10 includes pads 36 for supporting the photovoltaic panel which are lifted so as to raise the photovoltaic panel.

The support pads 36 allow the positioning, the guidance, the wedging of the photovoltaic panel and the support of the feet of the mounters of the panels.

In addition, each support pad 36 is associated to a drilling area 38 which is arranged downstream of the support pads 36 in order to be protected from the water flow and which is raised so as to avoid the penetration of water.

By drilling area 38, is meant an area which is designed so as to enable the drilling and the passage of fastening device. The drilling area 38 may include an imprint or a mark indicating a drilling location, and/or an area mechanically pre-weakened in order to facilitate drilling, for example.

As can be seen in FIG. 2, each drilling area 38 is raised lesser than the associated support pad 36 so as to enable the arrangement of fastening device, such as screws (not represented), without these fastening device surpassing the associated support pad 36 in order not to hinder the set-up of the photovoltaic panel.

Besides, the support plate 10 delimits an empty space 40 intended for the passage of cables and for access to the framework of the roof.

The empty space 40 is surmounted by a bead 42 which is disposed so as to avoid the flow of the water coming from the ridge of the roof in the empty space 40.

A groove 44 is formed in the bead 42, allowing the passage of cables between the plate 10 and the photovoltaic panel.

As can be seen in FIG. 1, the plate 10 comprises a plurality of guide rails 46 which are arranged upstream of the empty space 40 along the flow direction of the water coming from the ridge of the roof, and which are generally arranged in an inverted V shape so as to divert the flow of the water on the lateral sides of the empty space 40.

Each guide rail 46 forms a lifted bead for diverting the flow of the water on the lateral sides of the empty space 40.

Besides, the plate 10 comprises means 50 for lifting the photovoltaic panel which allow ventilating the photovoltaic panel.

Finally, the plate 10 is equipped with wedges 52 which are arranged upstream of the support pads 36, and which allow flushing the water coming from the ridge of the roof.

In addition, the wedges 52 are designed so as to support the photovoltaic panel.

The plate 10 is formed in one single piece, with the possible exception of the reinforcement 34, in one form by injection molding, or by stamping or by any other manufacturing method.

The description of the disclosure is merely exemplary in nature and, thus, variations that do not depart from the substance of the disclosure are intended to be within the scope of the disclosure. For example, It will be understood that the plate 10 may also be designed and sized so as to enable mounting in a landscape fashion. Such variations are not to be regarded as a departure from the spirit and scope of the disclosure.

What is claimed is:

1. A support plate adapted to support a photovoltaic panel on top of the support plate and enable fastening and integration of the photovoltaic panel on a building roof, comprising:

vertical overlapping members formed by a transverse upper strip of the support plate and by a transverse lower strip of the support plate;

a first lateral fitting member disposed along a first side of the support plate;

a second lateral fitting member disposed along a second side of the support plate opposing the first side;

pads for supporting the photovoltaic panel thereon, the pads being raised; and an empty space for the passage of cables and for access to framework of the roof, wherein at least one of the vertical overlapping members is provided with a graduation which is configured to adjust a vertical overlap and a coverage between two juxtaposed support plates, and the graduation comprises a graduated measuring scale have markings.

2. The support plate according to claim 1, further comprising a plurality of guide rails arranged upstream of the empty space along a flow direction of water coming from a ridge of the roof, the plurality of guide rails being arranged in an inverted V shape so as to divert a flow of the water on lateral sides of the empty space, wherein each guide rail forms a bead for diverting the flow of the water on the lateral sides of the empty space.

3. The support plate according to claim 1, further comprising at least one reinforcement, wherein the first and second lateral fitting members each defines a hollow section formed in an inverted U shape, and the at least one reinforcement is an affixed part which is arranged in an opening delimited by each of the first and second lateral fitting members.

4. The support plate according to claim 1 further comprising a bead disposed so as to avoid the flow of the water coming from the ridge of the roof in the empty space.

5. The support plate according to claim 4 further comprising a groove formed in said bead, enabling the passage of cables between the support plate and the photovoltaic panel.

6. The support plate according to claim 1 further comprising drilling areas corresponding to the pads, wherein each drilling area is raised lesser than a corresponding one of the pads so as to enable the arrangement of a fastening device.

7. The support plate according to claim 1 further comprising wedges allowing flushing the water coming from the ridge of said roof.

8. A set formed by a photovoltaic panel and a support plate according to claim 1.

9. The support plate according to claim 1, wherein the first and second lateral fitting members each has an inverted U shape.

10. The support plate according to claim 3, further comprising a screw extending through the at least one reinforcement, the first fitting member of the support plate, and the second lateral fitting member of the adjacent support plate.

11. The support plate according to claim 10, wherein the first and second lateral fitting members and the at least one reinforcement each define a hole for receiving the screw.

12. The support plate according to claim 11, wherein the hole of the at least one reinforcement is aligned with the hole of the first lateral fitting member of the support plate and the hole of the second lateral fitting member of the adjacent support plate.

13. The support plate according to claim 1, wherein the graduation provides measurement of the vertical overlap of the two support plates that are juxtaposed.

14. The support plate according to claim 13, wherein the graduation is configured to adjust the vertical overlap based on dimensions of the photovoltaic panel installed on the support plate.

15. A support plate adapted to support a photovoltaic panel on top of the support plate and enable fastening and integration of the photovoltaic panel on a building roof, comprising:

vertical overlapping members formed by a transverse upper strip of the support plate and by a transverse lower strip of the support plate;

a first lateral fitting member disposed along a first side of the support plate;

a second lateral fitting member disposed along a second side of the support plate opposing the first side;

pads for supporting the photovoltaic panel thereon, the pads being raised; and an empty space for the passage of cables and for access to framework of the roof, wherein at least one of the vertical overlapping members is provided with a graduation which is configured to adjust a vertical overlap and a coverage between two juxtaposed support plates, the graduation represents a graduated measuring scale, and the graduated measuring scale is engraved on the support plate.

16. A support plate adapted to support a photovoltaic panel on top of the support plate and enable fastening and integration of the photovoltaic panel on a building roof, comprising:

vertical overlapping members formed by a transverse upper strip of the support plate and by a transverse lower strip of the support plate;

a first lateral fitting member disposed along a first side of the support plate;

a second lateral fitting member disposed along a second side of the support plate opposing the first side;

pads for supporting the photovoltaic panel thereon, the pads being raised; and an empty space for the passage of cables and for access to framework of the roof, wherein at least one of the vertical overlapping members is provided with a graduation which is configured to adjust a vertical overlap and a coverage between two juxtaposed support plates, the graduation comprises a graduated measuring scale having markings printed on the support plate.

17. A support plate adapted to support a photovoltaic panel on top of the support plate and enable fastening and integration of the photovoltaic panel on a building roof, comprising:

vertical overlapping members formed by a transverse upper strip of the support plate and by a transverse lower strip of the support plate;

a first lateral fitting member disposed along a first side of the support plate;

a second lateral fitting member disposed along a second side of the support plate opposing the first side;

pads for supporting the photovoltaic panel thereon, the pads being raised; and an empty space for the passage of cables and for access to framework of the roof, wherein at least one of the vertical overlapping members is provided with a graduation which is configured to adjust a vertical overlap and a coverage between two juxtaposed support plates, the graduation comprises a graduated measuring scale having markings molded on the support plate.

\* \* \* \* \*